(12) United States Patent
Walker et al.

(10) Patent No.: US 7,481,374 B2
(45) Date of Patent: Jan. 27, 2009

(54) SYSTEM AND METHOD FOR PLACEMENT AND RETRIEVAL OF EMBEDDED INFORMATION WITHIN A DOCUMENT

(75) Inventors: John O. Walker, Rochester, NY (US); James W. Reid, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 601 days.

(21) Appl. No.: 11/148,130

(22) Filed: Jun. 8, 2005

(65) Prior Publication Data
US 2006/0278724 A1  Dec. 14, 2006

(51) Int. Cl.
G06K 19/06 (2006.01)
(52) U.S. Cl. .................... 235/494; 235/487
(58) Field of Classification Search ............. 235/380, 235/375, 487, 494
See application file for complete search history.

(56) References Cited

U.S. PATENT DOCUMENTS

| | | | |
|---|---|---|---|
| 4,728,984 A | 3/1988 | Daniele | 355/6 |
| 5,444,779 A | 8/1995 | Daniele | 380/3 |
| 5,449,895 A | 9/1995 | Hecht et al. | 235/494 |
| 5,449,896 A | 9/1995 | Hecht et al. | 235/494 |
| 5,453,605 A | 9/1995 | Hecht et al. | 235/494 |
| 5,572,010 A | 11/1996 | Petrie | 235/494 |
| 5,682,540 A | 10/1997 | Klotz, Jr. et al. | 395/766 |
| 5,862,271 A | 1/1999 | Petrie | 382/309 |
| 5,939,703 A | 8/1999 | Hecht et al. | 235/494 |
| 5,982,956 A | 11/1999 | Lahmi | 382/306 |
| 6,076,738 A | 6/2000 | Bloomberg et al. | 235/494 |
| 6,078,698 A | 6/2000 | Lorton et al. | 382/278 |
| 6,175,714 B1 | 1/2001 | Crean | 399/366 |
| 6,233,684 B1 | 5/2001 | Stefik et al. | 713/176 |
| 6,298,171 B1 | 10/2001 | Lorton et al. | 382/278 |
| 6,641,053 B1 | 11/2003 | Breidenbach et al. | 235/494 |
| 2007/0127771 A1* | 6/2007 | Kaneda et al. | 382/100 |

* cited by examiner

Primary Examiner—Karl D. Frech
(74) Attorney, Agent, or Firm—Fleit Gibbons Gutman Bongini & Bianco P.L (57) ABSTRACT

A system and method for the placement and retrieval of embedded data blocks within a document includes converting a document into a bitmap image; calculating a total area required to embed information; analyzing the bitmap image for areas for placement of at least one embedded data block; calculating a total available area in the bitmap image to embed the information; dividing the information to encode into data packets; determining a location on the bitmap image to place at least one embedded data block; storing coordinate information for the location of the at least one embedded data block; creating a decoding protocol for at least one embedded data block; encoding the data packets and the decoding protocol into at least one embedded data block; and creating a bitmap image of at least one embedded data block.

20 Claims, 8 Drawing Sheets

FIG. 1

ASTRONOMY

Merit Badge Requirements

Table 1. Decoding Protocol for Document 100

| START → | 130A | 140B | 130B | 170H | 160D | 180G | |
|---|---|---|---|---|---|---|---|
| | 130E | 110A | 110H | 180A | 180B | 140H | |
| | 180D | 180C | 110B | 130F | 140A | 160G | |
| | 110E | 170D | 180H | 160H | 180F | 130C | |
| | 110F | 160B | 110D | 180E | 140D | 170C | |
| | 160A | 170B | 130D | 140G | 170E | 160F | |
| | 140C | 130H | 170A | 160C | 130G | 160E | |
| | 170G | 140F | 170F | 110C | 140E | 110G | ← END |

FIG. 8

SYSTEM AND METHOD FOR PLACEMENT AND RETRIEVAL OF EMBEDDED INFORMATION WITHIN A DOCUMENT

RELATED APPLICATIONS

None.

FIELD

The embodiments described herein relate to documents containing embedded information, and more particularly to a system and method for the placement and retrieval of multiple embedded data blocks within a document.

BACKGROUND

An embedded data block (EDB) is a two-dimensional image symbology for the storage and retrieval of data. EDBs are composed of embedded data characters, some of which are encoded to define a synchronization frame and others of which are encoded to carry user/application-specific information. The synchronization frame and the user information are the two major structural components of an EDB. Patents relating to the encoding of EDBs include U.S. Pat. No. 5,453,605, U.S. Pat. No. 5,449,896, U.S. Pat. No. 5,572,010, U.S. Pat. No. 5,862,271 and U.S. Pat. No. 5,939,703, all of which are incorporated by reference in their entireties for the teachings therein.

One example of an EDB is a glyph block. Glyph blocks encode information, for example, text, data and graphics, in thousands of tiny glyphs. Typically, glyph blocks are written on a recording medium in accordance with a regular and repeating spatial formatting rule that is selected to map the glyph encodings into a two dimensional, rectangular array of logical data blocks of predetermined size, such as data blocks having a 16 symbol cell×16 symbol cell format. These data blocks suitably are organized sequentially on the recording medium in left-to-right, top-to-bottom logical order. Glyph block detection is then also be performed sequentially.

The existing techniques for decoding glyph codes are designed to be initialized at or near the center of a reference glyph that occupies a known spatial position relative to the remainder of the glyph code (for example, the reference glyph is located in the upper, left-hand corner of a rectangular array of glyphs). Thus, accurately locating this reference glyph is a key to spatially synchronizing the decoding process with the glyph code. The decoding of glyphs is often time-consuming, inefficient, and inaccurate. Therefore, it would be desirable to have a more efficient way to encode and decode glyphs on a recording medium.

SUMMARY

A system and method for the placement and retrieval of multiple embedded data blocks within a document wherein the multiple embedded data blocks contain encoded information and a decoding protocol. The decoding protocol defines the order in which the multiple embedded data blocks are decoded.

A system for placing at least one embedded data block on a document comprises an input device for converting a document into a bitmap image; a layout analyzer for determining a number and a location of the embedded data blocks for encoding information; a disassembler for dividing the information; a page navigator for tracking the coordinates of the embedded data blocks in the bitmap image; a coordinate tracker in operative communication with the page navigator module for obtaining the coordinates of the embedded data blocks; an embedded data block creator for encoding the information into at least one embedded data block; and a writer for writing a bitmap image of the at least one embedded data block onto a working bitmap image.

A system for retrieving information from at least one embedded data block on a document comprises an input device for converting a document into a bitmap image, the document comprising at least one embedded data block that encodes information; an embedded data block reader for reading the at least one embedded data block; an embedded data block decoder for extracting encoded information from the at least one embedded data block; a coordinate tracker for tracking coordinate information retrieved from each decoded embedded data block; a page navigator for receiving the coordinate information from the coordinate tracker and using the coordinate information to locate a position of the embedded data block to be decoded next; and a reassembler for gathering the decoded information in order from the at least one embedded data block and adding the decoded information onto a working bitmap image.

A method for placing at least one embedded data block on a document comprises converting a document into a bitmap image; calculating a total area required to embed information; analyzing the bitmap image for potential areas for placement of at least one embedded data block; calculating a total available area in the bitmap image to embed the information; dividing the information to encode into data packets; determining a location on the bitmap image where at least one embedded data block will be placed; storing coordinate information for the location of the at least one embedded data block; creating a decoding protocol for the at least one embedded data block; encoding the data packets and the decoding protocol into at least one embedded data block; and creating a bitmap image of the at least one embedded data block.

A method for retrieving information from at least one embedded data block on a document comprises converting a document into a bitmap image, the document comprising information to be decoded; scanning the document to find an initial embedded data block to decode; decoding the initial embedded data block and saving the decoded information; searching the initial embedded data block for a decoding protocol; using the decoding protocol to decode all of the at least one embedded data blocks in a specified order and saving the decoded information; and appending the decoded information in the specific order onto a new bitmap image.

BRIEF DESCRIPTION OF THE DRAWINGS

The presently disclosed embodiments will be further explained with reference to the attached drawings, wherein like structures are referred to by like numerals throughout the several views. The drawings are not necessarily to scale, the emphasis having instead been generally placed upon illustrating the principles of the presently disclosed embodiments.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

A system and method for the placement and retrieval of embedded information on a recording medium is a simple and intuitive encoding/decoding tool that enables users to encode large amounts of information provided on a recording medium into embedded data blocks (EDBs) and dispersing the EDBs throughout the recording medium. In the method, EDBs can be dispersed throughout the recording medium without having a preselected spatial formatting rule, where embedded data blocks are organized on the recording medium in left-to-right, top-to-bottom or other predefined order. The EDBs contain encoded information as well as a decoding protocol that defines the rules for decoding.

With respect to the following figures, the recording medium is paper. Those skilled in the art will recognize that other recording mediums including, but not limited to, labels, plastic, glass, metal and electronic mediums are within the scope and spirit of the presently disclosed embodiments.

Figure 1:
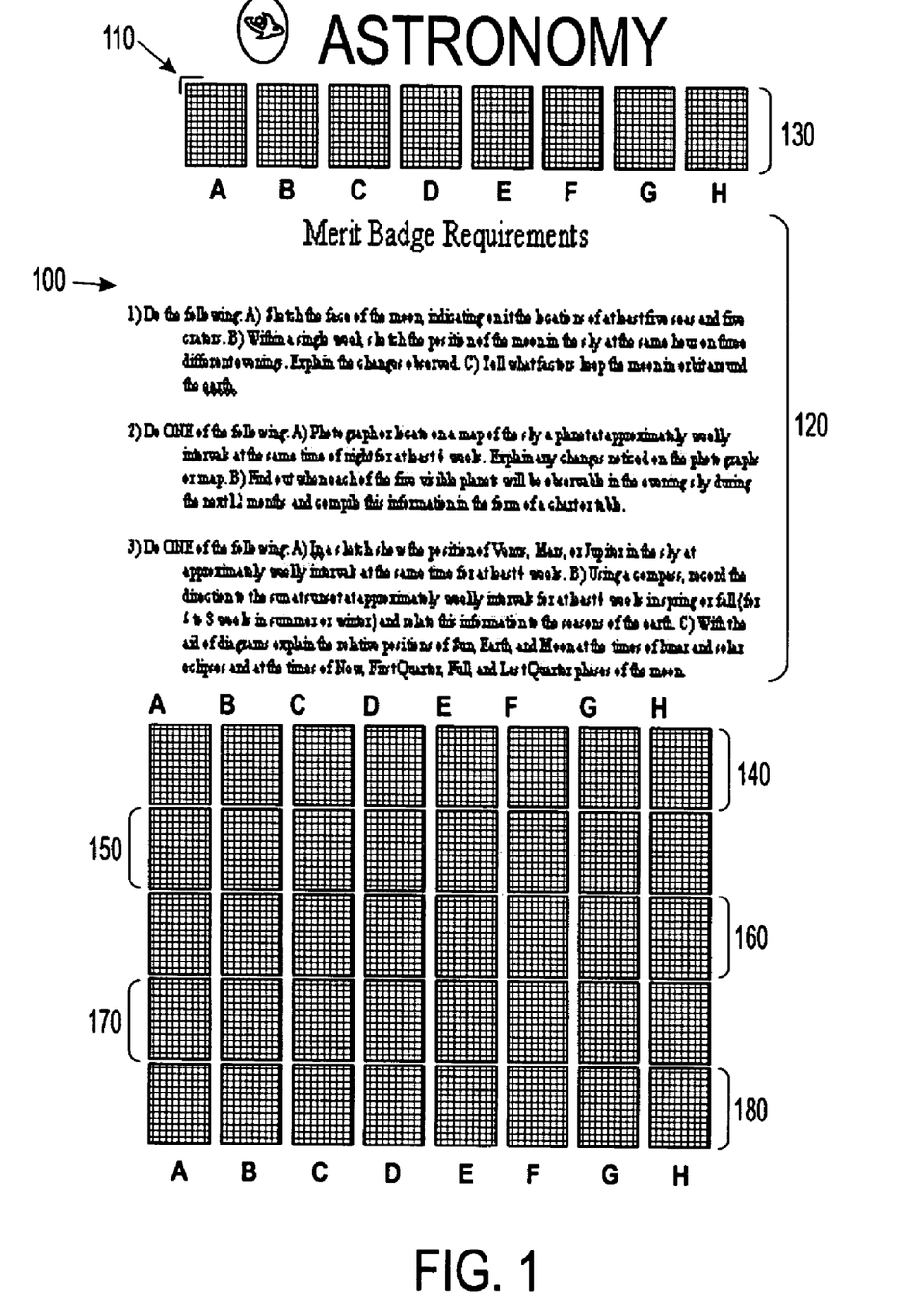
FIG. 1 is an exemplary illustration of a document containing multiple embedded data blocks created using the system and method disclosed herein.

FIG. 1 is an example of a document 100 that has been created using the system and method disclosed herein. The document 100 includes both human-readable text 120 and embedded machine-readable glyph blocks 130, 140, 150, 160, 170, 180 which have been incorporated into the whitespace areas 220 and 240 of an original document 200 shown in FIG. 2. A document created using the system and method disclosed herein may include glyph blocks either alone or in conjunction with human-readable text. The letters A-H written underneath the glyph blocks are for illustrative purposes only, and would not be present on the actual document produced using the system and method disclosed herein. In the example document 100 of FIG. 1, a marker 110 helps the system locate the starting glyph block for the decoding process. The marker 110 in the upper left-hand corner of the glyph block 130A indicates that glyph block 130A is the first glyph block to be decoded. The glyph blocks 130, 140, 150, 160, 170, 180 encode data as well as a decoding protocol. The decoding protocol links together the glyph blocks according to the processes described herein. The decoding protocol defines the order in which the encoded data that is embedded in the glyph blocks are decoded. The decoding protocol could link glyph blocks in a sequential order, non-sequential order, a random order or any user defined order. For example, a decoding protocol that defines a sequential order would link initial glyph block 130A to glyph block 130B to glyph block 130C to glyph block 130D to glyph block 130E to glyph block 130F to glyph block 130G to glyph block 130H to glyph block 140A to glyph block 140B, and so on until reaching glyph block 180H.

Figure 2:
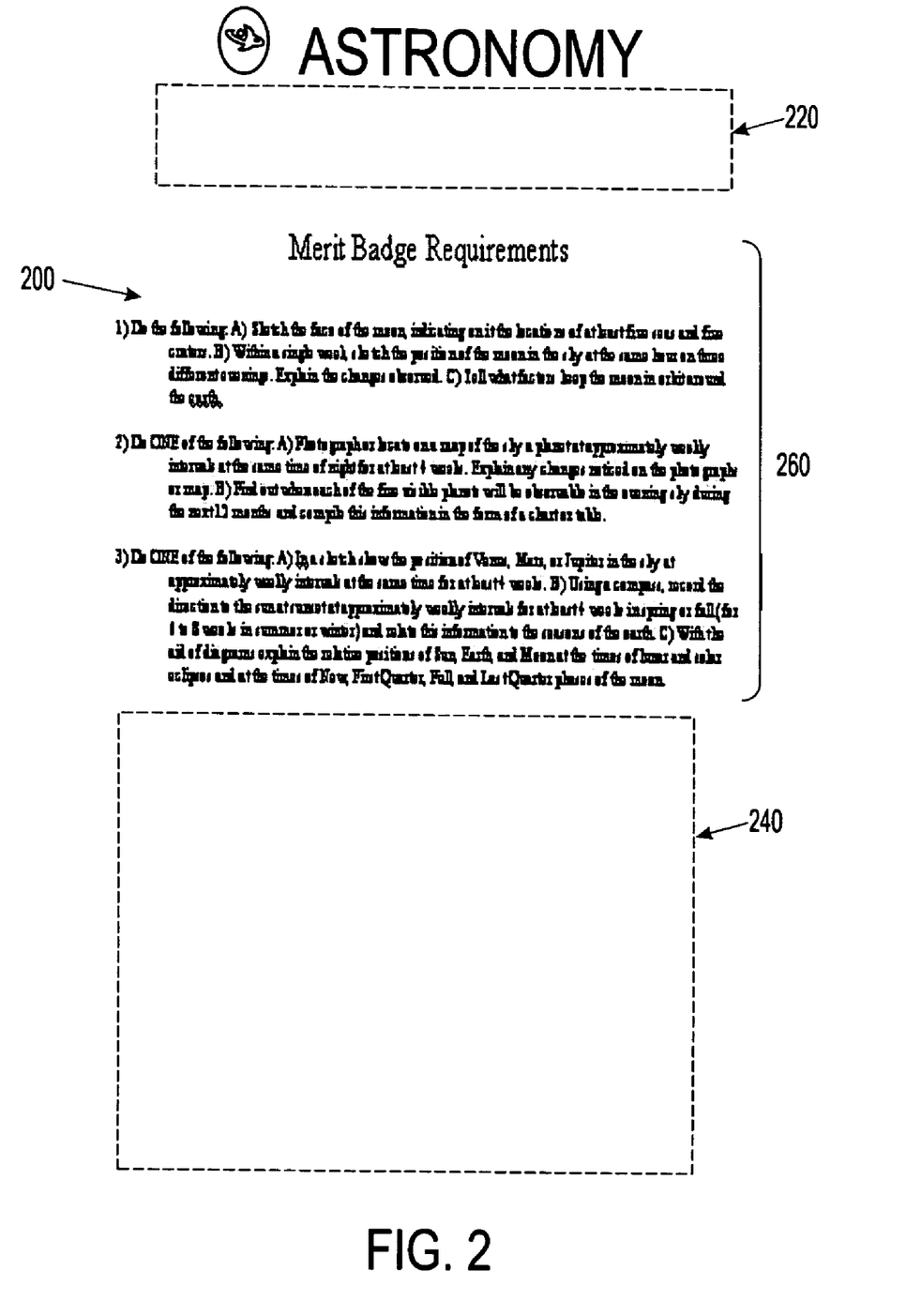
FIG. 2 is an exemplary illustration of a document containing whitespace that can be used to create the document containing multiple embedded data blocks shown in FIG. 1.

FIG. 2 is an example of the original document 200 used to create the document 100 from FIG. 1 using the system and method disclosed herein. The document 200 includes human-readable text 260 and whitespace areas 220 and 240. The whitespace areas 220 and 240 are used for embedding the glyph blocks 130, 140, 150, 160, 170, 180 shown in FIG. 1. The dotted lines surrounding the whitespace areas 220 and 240 are for illustrative purposes only, and would not be present in the original document 200. The original document may be a hardcopy, an electronic document file, one or a plurality of electronic images, electronic data from a printing operation, a file attached to an electronic communication or data from other forms of electronic communication.

Figure 3:
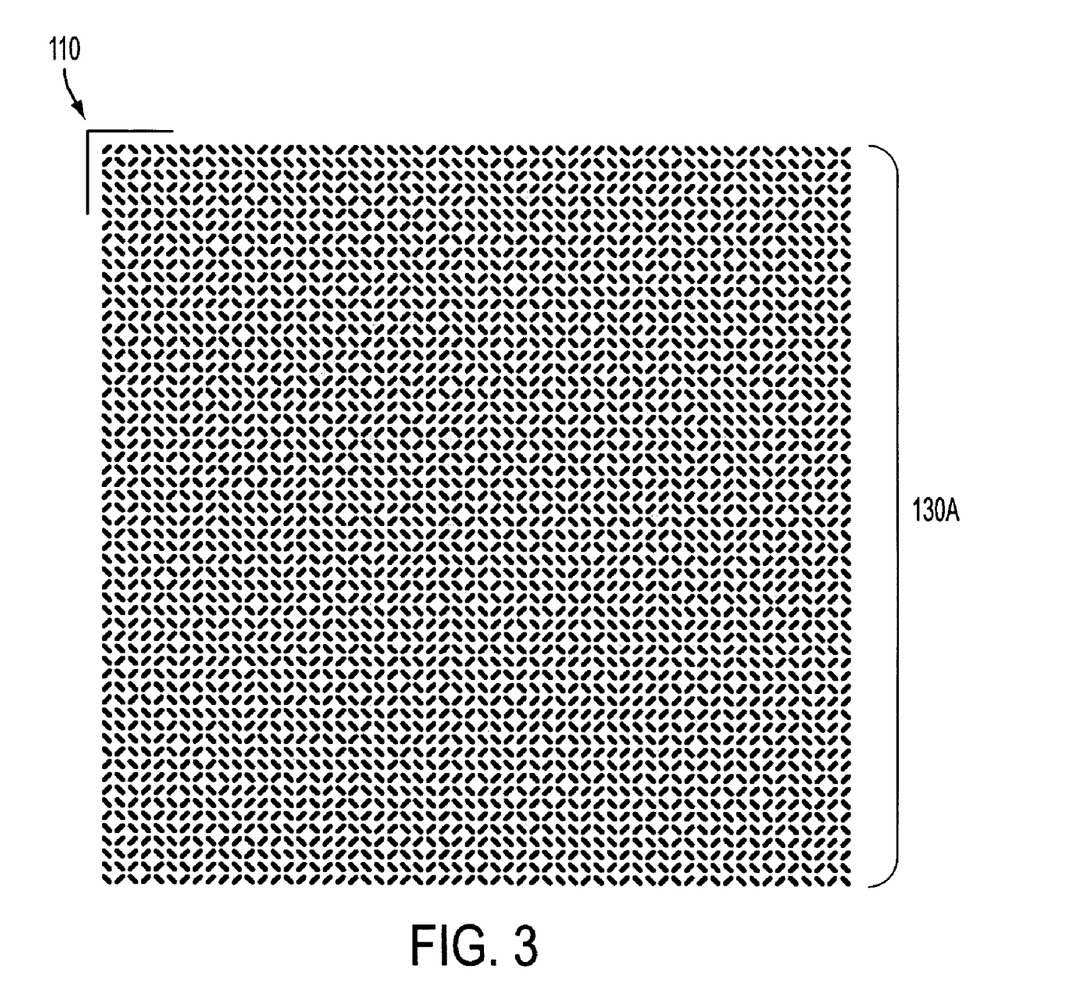
FIG. 3 is an enlarged view of the initial embedded data block of FIG. 1.

FIG. 3 shows an enlarged view of the initial glyph block 130A from FIG. 1, along with the marker 110. The glyph block 130A is made up of a plurality of tiny glyphs. Each glyph consists of a 45-degree diagonal line, as short as one one-hundredth of an inch or less, depending on the resolution of the printing and scanning used. Each glyph represents a single binary 0 or 1, depending on whether the glyph slopes to the right or left. Those skilled in the art will recognize that glyphs composed of different characters, shapes and formation are within the spirit and scope of the presently disclosed embodiments.

Figure 4:
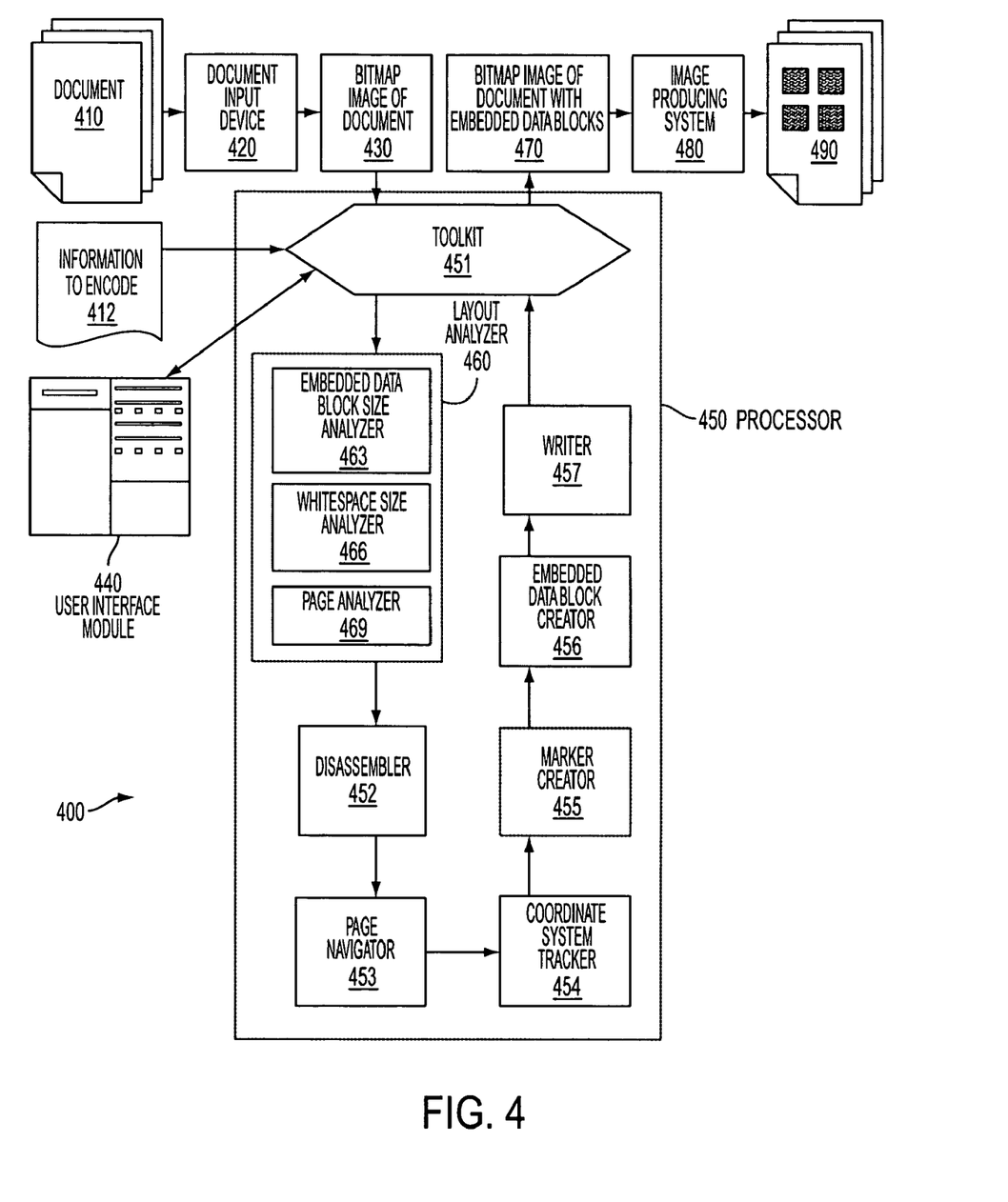
FIG. 4 is a schematic diagram showing the main components of a system for the placement of embedded data blocks on a document.

FIG. 4 shows a system 400 for embedding encoded information on a document 410. The system 400 includes a number of components that will be described. The system 400 includes a document input device 420 which receives and translates the document 410 into a bitmap image 430. The document input device 420 may include one or more of the following known devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, or a hard disk or other digital storage media having one or more document images recorded thereon. Those skilled in the art will recognize that the system 400 would work with any device suitable for printing or storing a digitized representation of a document.

The document input device 420 is customarily a bitmap scanner which scans the image of each hardcopy input document, at a predetermined spatial resolution, for example, 300 s.p.i.×300 s.p.i. (spots/inch) or 600 s.p.i.×600 s.p.i. In operation, the scanner converts the individually resolved picture elements (commonly called "pixels" or "pels") of the scanned image into corresponding digital values and assembles those digital values to produce a data structure (the bitmap image 430) which preserves the spatial relationship of the pixels to which the scanned-in-values pertain. Although the following description focuses on applications in which the scanner is a black-and-white scanner for converting the pixels of the scanned-in-image into single bit digital values (i.e., "1" or "0"), it will be understood that the scanner could be a gray-scale or color scanner for converting the pixels into multi-bit values of gray or color respectively. Furthermore, it will be evident that the scanner could capture a bitmap image or a document through the use of a video pick-up device and a video "frame grabber," together with appropriate thresholding logic if needed.

The document 410 may also be generated electronically and saved in bitmap format. It will be understood by one skilled in the art that bitmap document images may be readily converted into or derived from other electronic image formats, including, but not limited to, JPEG, PDF and TIFF and similar images.

A processor, which is shown generally at 450, under a program control executes the control instructions and document image editing and manipulation instructions. The execution of these instructions is handled by several different modules which will be described below.

A user interface module 440 collectively represents the input devices through which the user enters control instructions for the document image editing and manipulation instructions for the processor 450. Additionally, the user interface module 440 represents the output devices through which the user receives feedback regarding the actions that are taken in response to the instructions that are entered by the user or otherwise, such as under program control. For example, the user interface 440 generally includes a keyboard or another input instrument for entering user instructions, a monitor for viewing the process that is being performed by the processor 450, and a cursor controller allowing the user to move a cursor for making selections from and/or for entering data into a process that is being displayed by the monitor (none of these conventional components are shown). The user interface 440 may include, for example, a personal computer utilizing a typical keyboard and display.

A toolkit 451 is a software program that works with the processor 450. The toolkit 451 processes the bitmap image 430 of the original document 410. The original document 410 may contain information to encode 412. Alternately, the information to encode 412 may come from another source, such as a separate document that exists in the memory of the processor 450 or a separate document that has been translated using the document input device 420. Those skilled in the art will recognize that the information to encode 412 can come from various sources and be within the scope and spirit of the presently disclosed embodiments. The toolkit 451 works in conjunction with the modules described herein and encodes EDBs for eventual integration into a new bitmap image 470.

A layout analyzer module 460 determines how many EDBs are needed to encode the information 412, and where the EDBs will be placed within the document 410. The layout analyzer module 460 consists of the following sub-modules: an EDB size analyzer module 463, a whitespace size analyzer module 466, and a page analyzer module 469. The EDB size analyzer module 463 estimates the overall size (in pixel width and height) of an EDB needed to encode the information 412 of the document 410. The whitespace size analyzer module 466 processes the bitmap image 430, to determine the available whitespace on the document 410 and the corresponding number of EDBs that can be encoded and placed in the whitespace on the document 410. The page analyzer module 469 determines how many pages are needed to fit all of the EDBs.

Once the number and placement of EDBs are determined, a disassembler module 452 divides the information 412 into encodable "data packets"—each of the data packets being able to be encoded into the size of an EDB. An EDB creator module 456 takes the data packets obtained from the disassembler module 452 and encodes the information into EDBs. A page navigator module 453 continually focuses on the current working coordinates of a given EDB, and a coordinate system tracker module 454 stores the current working coordinates of all of the EDBs in the document 410.

The EDB creator module 456 also encodes a decoding protocol into each of the EDBs. The decoding protocol links together all of the EDBs such that the EDBs can be decoded in the same order in which they were encoded. In an embodiment, the decoding protocol defines the coordinate location of the next logical EDB to be decoded. The coordinate information for each of the EDBs is obtained from the coordinate system tracker module 454. For example, the first encoded EDB contains a decoding protocol that defines the X-, Y- and Z-coordinates of the second encoded EDB. The second encoded EDB contains a decoding protocol that defines the X-, Y- and Z-coordinates of the third EDB, and so on.

A marker may be placed at any location bordering the first EDB, for example, the marker 110 is shown in FIG. 3. The marker provides an initial starting point for decoding to increase the efficiency and simplicity of the decoding process. As shown in FIG. 4, a marker creator module 455 creates a bitmap image of a marker, which is merged with the EDB bitmap image to aid in locating an EDB within the document 410. A writer module 457 is responsible for creating the new bitmap image of a document 470 which contains EDBs and a marker. An image producing system 480 can reproduce the new document 490 which contains embedded data blocks and a marker. The new document may be a hardcopy, an electronic document file, one or a plurality of electronic images, electronic data from a printing operation, a file attached to an electronic communication or data from other forms of electronic communication.

Figure 5:
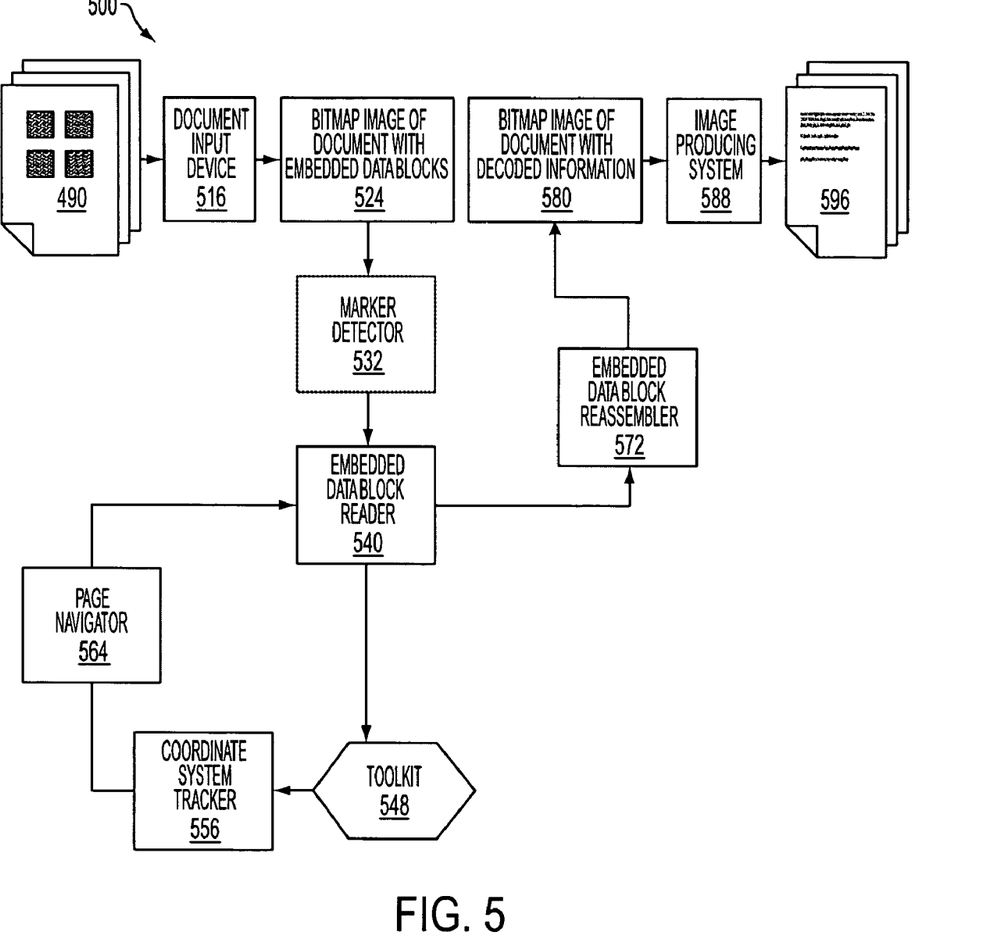
FIG. 5 is a schematic diagram showing the main components of a system for decoding embedded data blocks on a document.

As shown in FIG. 5, a decoding system 500 for decoding EDBs on the document 490 of FIG. 4 includes a document input device 516 which receives and translates the document 490 into a bitmap image 524. The document input device 516 may include, but is not limited to, one or more of the following known devices: a copier, a xerographic system, an electrostatographic machine, a digital image scanner (e.g., a flat bed scanner or a facsimile device), a disk reader having a digital representation of a document on removable media (CD, floppy disk, rigid disk, tape, or other storage medium) therein, or a hard disk or other digital storage media having one or more document images recorded thereon. Those skilled in the art will recognize that the system 500 would work with any device suitable for printing or storing a digitized representation of a document. The image processing for decoding such EDBs can tolerate a significant amount of image distortion and degradation, so EDBs carried by scanned-in photocopies and facsimile copies can be decoded, provided that the scanned-in document is readable and not too many generations removed from the original.

The bitmap image 524 of the document 490 may be processed by a marker detector module 532. The marker detector module 532 scans the bitmap image 524 of the document 490 and searches for a marker (such as marker 110 from FIG. 1), which is typically located at a boundary of the initial embedded data block and is the starting point for initial detection and decoding of the document 490. An EDB reader 540 reads each of the EDBs into memory from the bitmap image 524. Using a decoding software toolkit 548, the initial EDB is decoded. The information extracted from the initial EDB is stored in memory and the decoding protocol is analyzed to determine where the next logical EDB to decode is located in the bitmap image 524. In an embodiment, the decoding protocol defines the coordinate location of the next logical EDB to decode. A coordinate system tracker module 556 is responsible for taking the coordinate information retrieved from each decoded EDB and supplying this information to a page navigator module 564, to identify the next EDB to be decoded. The page navigator module 564 is responsible for continually moving focus to the current working coordinates of the EDB being decoded. An EDB reassembler module 572 is responsible for writing the decoded information from the EDBs in the specified order onto a new bitmap image 580. An image producing system 588 can reproduce a new document 596 which contains the decoded information in the correct order. Alternately, the decoded information from each of the EDBs can be stored and saved in an electronic document file and used for integration in a new document or an existing document. Those skilled in the art will recognize that the decoded information from each of the EDBs can be used in a number of applications and systems and be within the scope and spirit of the presently disclosed embodiments.

With reference to the embodiments described herein, the EDBs are configured as glyph blocks. Those skilled in the art will realize that other types of embedded data blocks, including, but not limited to, microdots, and multi-dimensional barcodes and similar machine readable codes are within the spirit and scope of the presently disclosed embodiments.

Figure 6:
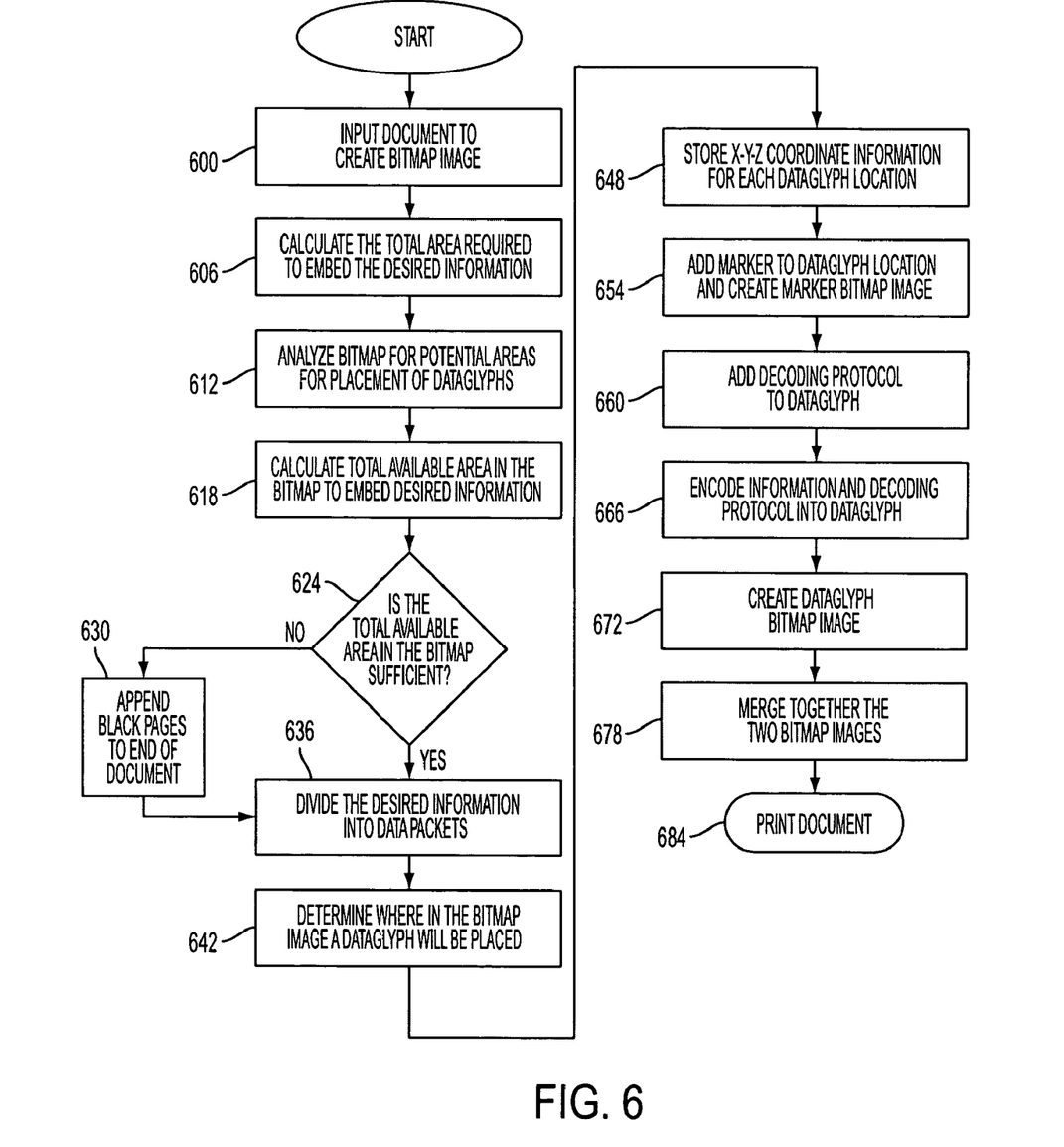
FIG. 6 is a flow diagram for a method of placing embedded data blocks on a document.

FIG. 6 is a flow diagram illustrating a method for creating a document with one or more glyph blocks. In general, the method includes spreading blocks of linked glyphs across the open spaces of a document. In addition to the encoded information, each glyph block embeds a decoding protocol. The decoding protocol defines the order in which the one or more glyph blocks should be decoded, such that the divided information, or data packets, can be decoded in the correct order. In an embodiment, each of the one or more glyph blocks contains relative location indices that relate the current decoded glyph block to the next logical glyph block to be decoded. In an embodiment, each of the one or more glyph blocks is assigned a unique identifier (for example, "A 1", "Block 1", or similar identifiers), that is embedded into the glyph block along with the data packets. In other embodiments, the indices and order for decoding is stored in a glyph block table format that defines all or part of the glyph block decoding order. Examples of decoding protocols include, but are not limited to, a table that lists the glyph blocks unique identifier in order of decoding, a table that lists the coordinate information of each glyph block in order of decoding, a table that lists the coordinate information of each remaining glyph block to be decoded in order of decoding, and actual relative location indices, in each of the one or more glyph blocks which relates the current decoded glyph block to the next logical glyph block to be decoded. Those skilled in the art will recognize that the decoding protocol may include both the decoding order based on a unique identifier and the coordinate information of each glyph block in order of decoding and be within the scope and spirit of the presently disclosed embodiments. The final glyph block to be decoded may have a stop signal indicating to the decoder that the final glyph block has been reached.

Referring to FIG. 4 and FIG. 6, in step 600, a user inputs the document 410 into a document input device 420 which translates the document 410 into a bitmap image 430. The user may begin running a software program for encoding glyph blocks, such as the glyph toolkit 451 commercially available from Xerox PARC. The document 410 may contain information to encode 412. Alternately, the information to encode 412 may come from another source, such as a separate document that exists in the memory of the processor 450 or a separate document that has been translated using the document input device 420. The layout analyzer module 460 is initiated. The layout analyzer module 460 consists of sub-modules that determine the number of glyph blocks needed to encode the information within the document and where the glyph blocks will reside within the document. The EDB size analyzer module 463 is responsible for estimating the overall size (in pixel width and height) of the glyph block needed to encode the given information, as shown in step 606.

In step 612, the whitespace analyzer module 466 analyzes the bitmap image 430 for potential areas (typically rectangular areas) that a glyph block may be placed within the document 410. EDBs may be placed in any area of a document including, but not limited to, margins, header/footer regions, images and whitespace. Optionally, yellow glyph blocks may be used, which are a nearly invisible way to embed information in a printed document. If yellow glyph blocks are used, then the entire document 410 can be used because yellow glyph blocks blend into the background of the document and are unobtrusive for viewing the document.

In step 618, the page analyzer module 469 calculates the total available area for placement of glyph blocks in the document 410. In step 624, the method determines whether the total available area for placement of glyph blocks is sufficient. If the total available area is insufficient, then blank pages are appended to the end of the document 410 to meet the total required area for the encoded glyph block, as shown in step 630. If the total available area is sufficient, then the method proceeds to step 636.

Once the method determines where glyph blocks can fit within the document 410, the information to be encoded is divided up into "data packets" using the glyph disassembler 451, as shown in step 636. Glyph blocks of various size and shape can be embedded onto the document 410 to fit the available whitespace and aesthetic requirements of the document. An advantage of the method is that glyph blocks can be distributed within a document in any order, the order being defined by a decoding protocol that is also encoded in the glyph block.

Glyph block placement within the bitmap image 430 of document 410 is determined, as shown in step 642. The page navigator module 453 continually focuses on the current working coordinates of a given glyph block, and the coordinate system tracker module 454 stores the current working coordinates of all of the glyph blocks in the bitmap image 430 of document 410, as shown in step 648.

A marker bitmap image is created which will be merged with a glyph block bitmap image. The machine detectable marker, which identifies the starting glyph block for decoding, resides at or near a boundary of the starting glyph block of the document 410. Typically, only the first glyph block will have a marker, although in some circumstances it may be desirable to place a marker near each glyph block. The marker can be placed at any location bordering the glyph block. For example, the marker 110 may be placed in the upper left-hand corner of the glyph block, as shown in FIG. 1. Those skilled in the art will recognize that placement of the marker at any boundary of the glyph block is within the scope and spirit of the presently disclosed embodiments. The marker increases the efficiency and simplicity of the decoding process by providing the initial starting point for decoding. Once the location of the marker(s) at a glyph block border has been determined, the marker creator module 455 creates a "marker" bitmap image, as shown in step 654.

In addition to the information to be encoded, each glyph block contains a decoding protocol, as shown in step 660. In step 666, the information and the decoding protocol are encoded into one or more glyph blocks. In step 672, the writer module 457 writes a bitmap image of the glyph blocks onto a working bitmap image. In step 678, the bitmap image of the glyph blocks and the bitmap image of the marker are "merged" together to form the new bitmap image 470. The image producing system 480 reproduces the new document 490 from the contents of the new bitmap images 470, step 684.

Figure 7:
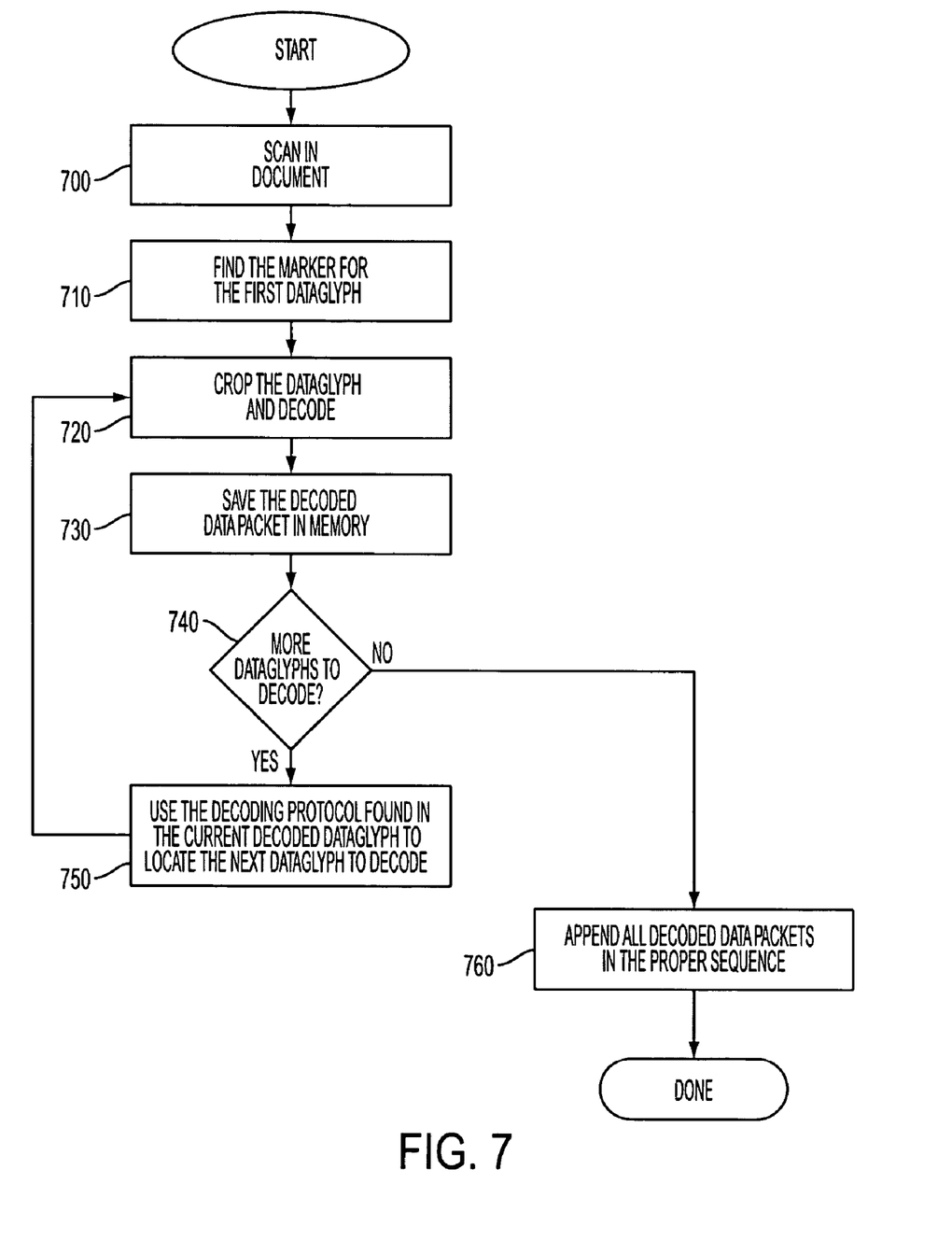
FIG. 7 is a flow diagram for a method of decoding embedded data blocks on a document.

In the decoding process illustrated in FIG. 7, the bitmap image 524 of the document 490 is scanned in, as shown in step 700. The bitmap image 524 of the document 490 is processed morphologically and/or through the use of a pixel search technique to isolate a marker using the marker detector 532 which locates the first glyph block, as shown in step 710. A software program for decoding glyph blocks is initiated, such as the glyph toolkit commercially available from Xerox PARC. The toolkit can locate an initial glyph block, crop or snip the glyph block from the bitmap image 524 and into a new bitmap image, and then decode the glyph block using the glyph decoder, as shown in step 720. The data packet obtained from the first decoded glyph block is saved in memory, as shown in step 730. Other commercially available toolkits for decoding glyph blocks may not crop or snip the glyph block before the decoding step. Those skilled in the art will recognize that the glyph blocks can be decoded using any commercially available toolkit for decoding glyph blocks and still be within the scope and spirit of the presently disclosed embodiments.

The bitmap image 524 of the document 490 is further processed to determine if the document 490 contains additional glyph blocks to decode, as shown in step 740. If the document 490 contains additional glyph blocks to decode, then the decoding protocol of the current glyph block decoded is analyzed to determine where in the bitmap image 524 to find the next glyph block to decode, as shown in step 750. The method then returns to step 720. When all of the glyph blocks within the bitmap image 524 of the document 490 have been decoded, the method continues to step 760 and the saved decoded data packets in the proper sequence are converted onto the working bitmap image 580 and saved. The image producing system 588 may then reproduce the document containing decoded information 596.

A method for placing at least one embedded data block on a document includes converting a document into a bitmap image; calculating a total area required to embed information; analyzing the bitmap image for potential areas for placement of at least one embedded data block; calculating a total available area in the bitmap image to embed the information; dividing the information to encode into data packets; determining a location on the bitmap image where the at least one embedded data block will be placed; storing coordinate information for the location of the at least one embedded data block; creating a decoding protocol for the at least one embedded data block; encoding the data packets and the decoding protocol into at least one embedded data block; and creating a bitmap image of the at least one embedded data block.

A method for retrieving information from at least one embedded data block on a document includes converting a document into a bitmap image, the document comprising information to be decoded; scanning the document to find an initial embedded data block to decode; decoding the initial embedded data block and saving the decoded information; searching the initial embedded data block for a decoding protocol; using the decoding protocol to decode all of the at least one embedded data blocks in a specified order and saving the decoded information; and appending the decoded information in the specific order onto a new bitmap image.

EXAMPLE 1

Decoding Protocol Defines Unique Identifiers

Figure 8:
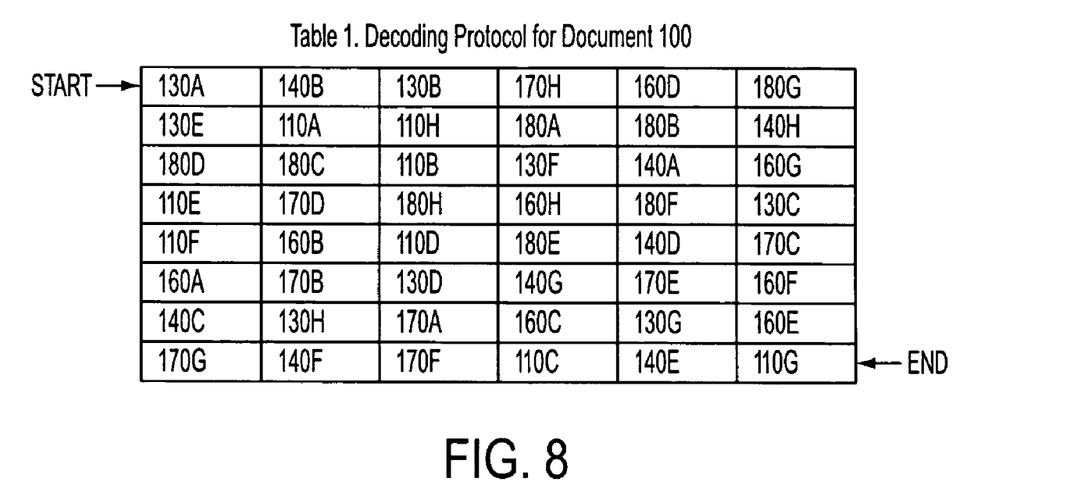
FIG. 8 is an exemplary illustration of a decoding protocol for the document of FIG. 1.

Glyph blocks contain encoded information as well as a decoding protocol. The decoding protocol embedded into each of the one or more glyph blocks communicate with a decoder, a software toolkit, and the modules disclosed herein to define the order in which the one or more glyph blocks should be decoded. The decoded information is then pieced back together in the correct order and written onto a bitmap image in human-readable form or otherwise made available. In a decoding protocol, each glyph block is assigned a unique identifier. A table that lists the unique identifiers, and may include the coordinate information of each of the glyph blocks, in order of decoding is embedded in one, some, or all of the glyph blocks on a document. Alternatively, the decoding protocol may be embedded within a separate glyph block also located within the document. Using document 100 from FIG. 1 as an example, each glyph block has been assigned a unique identifier (i.e., 130A, 170F, etc.) which has been encoded into each glyph block. As shown in FIG. 8, the order of decoding has also been embedded into the glyph blocks, such as the order shown in Table 1, where the decoding protocol starts reading across a row, then back to the first box in the next row, and continues until reaching the end of the decoding protocol.

EXAMPLE 2

Decoding Protocol Defines Coordinate Offset Information

A decoding protocol defines coordinate offset information. Each glyph block points to the next glyph block to be decoded. For example, each of the one or more glyph blocks is embedded with coordinate information relating the current decoded glyph block coordinates with the coordinates of the next glyph block to be decoded. An initial glyph block is found by searching for the marker 110. The initial glyph block contains the coordinates of the next glyph block to be decoded and the decoder moves to those coordinates and decodes that glyph block that contains the coordinates of the next glyph block to be decoded, and so on. The final glyph block to be decoded may have a stop signal which would tell the decoder that the final glyph block has been reached. The last data block in the glyph block is the address of the next glyph block. Those skilled in the art will recognize that any data block in the glyph block may contain the address of the next glyph.

The words "printing", "printed" or "printer" as used herein encompass any apparatus, such as a digital copier, bookmaking machine, facsimile machine, multi-function machine, etc. which performs a print outputting function for any purpose.

Although a monochrome printing apparatus has been described herein, the claims can encompass embodiments that print in color or handle color image data.

All patents, patent applications, and published references cited herein are hereby incorporated by reference in their entirety. It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A system for placing at least one embedded data block on a document, the system comprising:
    a layout analyzer for determining at least one whitespace area within a document, each of the at least one whitespace area being suitable to place a respective embedded data block image, the layout analyzer further determining an ordered plurality of locations within the at least one whitespace area to receive an ordered plurality of embedded data block images;

an embedded data block creator for encoding information into the ordered plurality of embedded data block images, the embedded data block creator further encoding, into the ordered plurality of embedded data block images, a specification of the ordered plurality of locations; and a writer for writing the ordered plurality of embedded data block images into the at least one whitespace area in accordance with the ordered plurality of locations.

2. The system of claim 1 further comprising an image producing system for converting the document having the ordered plurality of embedded data block images into a hardcopy document.

3. The system of claim 1 further comprising a marker creator for writing a marker into the document, wherein the marker is located in proximity to a pre-determined embedded data block image within the ordered plurality of embedded data block images.

4. The system of claim 1 wherein the layout analyzer further comprises:
an embedded data block size analyzer for estimating an overall printed size of the ordered plurality of embedded data block images needed to encode the information;
a whitespace size analyzer for determining that the overall printed size of the ordered plurality of embedded data block images can be written in the at least one whitespace area within the document; and
a page analyzer for calculating, in response to the whitespace analyzer determining that the overall printed size of the ordered plurality of embedded data block images cannot be written in the at least one whitespace area, a number of additional blank pages to be appended to the document to write a remainder of the overall printed size of the ordered plurality of embedded data block images.

5. The system of claim 1, wherein the layout analyzer determines the at least one whitespace area that includes at least one margin of the document, and wherein the writer writes at least one embedded data block image into the at least one margin.

6. The system of claim 1, wherein the embedded data block creator encodes the specification of the ordered plurality of locations into a table and encodes the table into at least one embedded data block image within the ordered plurality of embedded data block images.

7. The system of claim 1, wherein the ordered plurality of embedded data block images comprises a current embedded data block image and a next embedded data block image that occurs immediately after the current embedded data block image within the ordered plurality of embedded data block images, and wherein the next embedded data block location that is associated with the next embedded data block image is encoded into the current embedded data block image.

8. The system of claim 1, wherein the specification of the ordered plurality of locations comprises locations of each of the ordered plurality of locations that are specified as relative locations from at least one other location within the ordered plurality of locations.

9. The system of claim 1, wherein the ordered plurality of locations comprises locations randomly distributed across the at least one whitespace area.

10. A system for retrieving information from at least one embedded data block on a document comprising:

an input device for accepting an image of a document comprising an ordered plurality of embedded data block images located in otherwise whitespace areas of the document, the ordered plurality of embedded data block images encoding information and further encoding a specification of an ordered plurality of locations within the document, each of the ordered plurality of locations containing a respective embedded data block image within the ordered plurality of embedded data block images;

an embedded data block reader for decoding a currently processed embedded data block image within the ordered plurality of embedded data block images;

an embedded data block decoder for extracting encoded information from the plurality of ordered embedded data block images;

a coordinate tracker for decoding, from within the plurality of embedded data block images, a subsequent location within the ordered plurality of locations, the subsequent location corresponding to a location within the document of a subsequent embedded data block image that follows the currently processed embedded data block image within the ordered plurality of embedded data block images;

a page navigator for receiving the subsequent location from the coordinate tracker and using the subsequent location to locate the subsequent embedded data block image, and wherein the embedded data block reader further decodes, in response to the page navigator receiving the subsequent location, the subsequent embedded data block image; and a reassembler for gathering decoded information that is decoded from the ordered plurality of embedded data block images, wherein the reassembler gathers the decoded information in order based upon associating embedded data block images within each respective location within the specification of the ordered plurality of locations.

11. The system of claim 10, wherein the reassembler further adds the decoded information to an image, the system further comprising an image producing system for converting the image comprising the decoded information into a hardcopy document.

12. The system of claim 11 wherein the image producing system comprises an electrostatographic machine.

13. The system of claim 10 further comprising a marker reader for scanning the document to locate a marker that is associated with a pre-determined embedded data block image within the ordered plurality of embedded data block images.

14. The system of claim 13, wherein the marker indicates a first embedded data block image within the ordered plurality of embedded data block images.

15. A method for placing at least one embedded data block on a document comprising:
determining at least one whitespace area within a document, each of the at least one whitespace area being suitable to place a respective embedded data block image, the layout analyzer further determining an ordered plurality of locations within the at least one whitespace area to receive an ordered plurality of embedded data block images encoded with information;
dividing the information to encode into data packets;
encoding the data packets and a specification of the ordered plurality of locations into the ordered plurality of embedded data block images; and
writing a bitmap image of at least one embedded data block image into the at least one whitespace area.

16. The method of claim 15 further comprising:
comparing a total available area in the at least one whitespace area to a total area required for the ordered plurality of embedded data block images; and
determining, based on the comparing, a number of additional blank pages to be appended to the document to write a remainder of the overall printed size of the ordered plurality of embedded data block images.

17. The method of claim 15 wherein each of plurality of embedded data block images are assigned a unique identifier.

18. The method of claim 17 wherein the specification of the ordered plurality of locations comprises relative location indexes that specify, relative to a location of a prior embedded data block image, a location of a next embedded data block image within the ordered plurality of embedded data block images.

19. A method for retrieving information from at least one embedded data block on a document comprising:
searching an image of a document to find an initial embedded data block, the image comprising an ordered plurality of embedded data block images located in otherwise whitespace areas of the document, the ordered plurality of embedded data block images encoding information and further encoding a specification of an ordered plurality of locations within the document, each of the ordered plurality of locations containing a respective embedded data block image within the ordered plurality of embedded data block images;
decoding a currently processed embedded data block image within the ordered plurality of embedded data block images;
decoding, from within the plurality of embedded data block images, a subsequent location within the ordered plurality of locations, the subsequent location corresponding to a location within the document of a subsequent embedded data block image that follows the currently processed embedded data block image within the ordered plurality of embedded data block images;
decoding, in response to decoding the subsequent location, the subsequent embedded data block image;
gathering the decoded information that is decoded from the ordered plurality of embedded data block images, wherein the reassembler gathers the decoded information in order based upon associating embedded data block images within each respective location within the specification of the ordered plurality of locations;
outputting the decoded information.

20. The method of claim 19 further comprising locating a marker identifying the initial embedded data block image in the document.

* * * * *